US009404749B2

(12) United States Patent
Hill et al.

(10) Patent No.: US 9,404,749 B2
(45) Date of Patent: Aug. 2, 2016

(54) CONTROL UNIT FOR OFF-ROAD VEHICLES INCLUDING HOUSING CONFIGURED TO FIT WITHIN PRE-EXISTING CAVITY OF OFF-ROAD-VEHICLE CAB

(75) Inventors: Donald J. Hill, Brisbane (AU); Aleksander Valdis Velde, Brisbane (AU); Stuart Gray, Brisbane (AU)

(73) Assignee: LEICA GEOSYSTEMS AG, Heerbrugg (CH)

( * ) Notice: Subject to any disclaimer, the term of this patent is extended or adjusted under 35 U.S.C. 154(b) by 2808 days.

(21) Appl. No.: 11/843,263

(22) Filed: Aug. 22, 2007

(65) Prior Publication Data

US 2008/0091343 A1 Apr. 17, 2008

Related U.S. Application Data

(60) Provisional application No. 60/839,571, filed on Aug. 23, 2006.

(51) Int. Cl.
*G01C 21/00* (2006.01)
*E02F 9/26* (2006.01)
*G01S 19/32* (2010.01)

(52) U.S. Cl.
CPC . *G01C 21/00* (2013.01); *E02F 9/26* (2013.01); *G01S 19/32* (2013.01)

(58) Field of Classification Search
CPC ............ E02F 9/26; G01C 21/00; G01S 19/32
USPC .............................. 701/50, 206, 207, 213, 215
See application file for complete search history.

(56) References Cited

U.S. PATENT DOCUMENTS

| | | | | |
|---|---|---|---|---|
| 4,376,298 A * | 3/1983 | Sokol et al. | ..................... | 701/34 |
| 4,642,770 A * | 2/1987 | Shirley | ............................. | 701/36 |
| 5,088,040 A * | 2/1992 | Matsuda et al. | ............... | 701/48 |
| 6,526,268 B1 * | 2/2003 | Marrah et al. | ............ | 455/186.1 |
| 6,681,176 B2 * | 1/2004 | Funk et al. | ..................... | 701/207 |
| 6,906,639 B2 * | 6/2005 | Lemelson et al. | ........... | 340/903 |
| 6,917,306 B2 * | 7/2005 | Lilja | ............................. | 340/903 |
| 7,065,440 B2 * | 6/2006 | Aral | ............................... | 701/50 |
| 7,200,490 B2 * | 4/2007 | Lange et al. | .................... | 701/23 |
| 7,203,582 B2 * | 4/2007 | Yokota | ........................... | 701/41 |
| 7,513,439 B2 * | 4/2009 | Eisenhour | .................... | 236/49.3 |
| 7,546,188 B2 * | 6/2009 | Nezu et al. | ...................... | 701/36 |
| 7,548,804 B2 * | 6/2009 | Rossow et al. | .................. | 701/36 |
| 7,853,404 B2 * | 12/2010 | Allen | ........................... | 701/213 |
| 2002/0124663 A1 * | 9/2002 | Tokumoto et al. | ........ | 73/862.333 |
| 2003/0130775 A1 * | 7/2003 | Lu et al. | .......................... | 701/36 |
| 2003/0135327 A1 * | 7/2003 | Levine et al. | ................. | 701/220 |
| 2004/0026158 A1 * | 2/2004 | Rieth et al. | .................... | 180/402 |
| 2005/0055147 A1 * | 3/2005 | Hrazdera et al. | ................ | 701/50 |
| 2005/0080555 A1 * | 4/2005 | Parupudi et al. | .............. | 701/200 |
| 2005/0234644 A1 * | 10/2005 | Lin | .............................. | 701/214 |
| 2005/0236223 A1 * | 10/2005 | Yokota | .......................... | 180/446 |
| 2006/0025894 A1 * | 2/2006 | O'Connor et al. | ................ | 701/1 |
| 2006/0200313 A1 * | 9/2006 | Bringuel et al. | .............. | 701/213 |
| 2007/0050108 A1 * | 3/2007 | Larschan et al. | ................ | 701/35 |
| 2008/0208468 A1 * | 8/2008 | Martin | .......................... | 701/213 |
| 2011/0071718 A1 * | 3/2011 | Norris et al. | .................... | 701/23 |

\* cited by examiner

*Primary Examiner* — Thomas G Black
*Assistant Examiner* — Sze-Hon Kong
(74) *Attorney, Agent, or Firm* — Maschoff Brennan

(57) ABSTRACT

A control unit disposed in the cab of an off-road vehicle includes a user interface; an attitude and heading reference system and a housing. The attitude and heading reference system includes a processor and at least one of a positioning receiver, magnetometer, compass, gyro and accelerometer electrically connected to the processor. The housing is sized to be fittingly received in a pre-existing DIN slot in the cab of the off-road vehicle.

20 Claims, 3 Drawing Sheets

CONTROL UNIT FOR OFF-ROAD VEHICLES INCLUDING HOUSING CONFIGURED TO FIT WITHIN PRE-EXISTING CAVITY OF OFF-ROAD-VEHICLE CAB

CROSS REFERENCE TO RELATED APPLICATION

This application claims the benefit of U.S. Provisional Patent Application No. 60/839,571, filed Aug. 23, 2006.

FIELD OF THE INVENTION

The preferred embodiment of the invention relates to a control unit for off-road vehicles. In particular, but not exclusively, the preferred embodiment relates to a control unit for off-road vehicles typically used in agricultural, construction, mining and forestry applications.

BACKGROUND TO THE INVENTION

Off-road vehicles typically used in, for example, agricultural, construction, mining and forestry applications, such as tractors, harvesters, diggers, graders, dump trucks and other powered vehicles, commonly comprise electronic equipment designed to control or monitor the vehicle and/or the operation of any implements or the like attached to the vehicle. Such electronic equipment is generally mounted randomly in the cab of the vehicle or on a single mounting bar provided in the cab. The vehicle will typically comprise electronic equipment that has been factory-fitted at the time of production of the vehicle and electronic equipment that has been retrofitted to the vehicle. This creates what is termed "cab clutter" and the vehicle operator is faced with a myriad of computing devices to contend with in the confined space of the cab.

Cab clutter creates a number of disadvantages. Vehicles of the same type will have similar electronic equipment installed, but this may be in different configurations from one vehicle to the next. Operators using different vehicles will therefore have to re-adjust to the particular configuration of the equipment in each vehicle cab.

Many off-road vehicles used in agricultural, construction, mining, forestry and similar environments have a wide array of electronic equipment to accommodate in the cab of the vehicle. For example, a typical vehicle used in such environments may comprise one or more of the following in the vehicle cab: a GPS receiver connected to antennae (the antennae may not be in the cab); a two-way radio for communications; an on-board computer for the control and monitoring of vehicle applications, such as an automatic/assisted steering system, or for attached external implements, such as a spraying or seeding boom; remote service and diagnostics equipment; an entertainment system, such as a radio and/or a CD player. Such electronic equipment is in addition to the gauges and other dashboard readouts informing the operator of the status of various aspects of the vehicle. Furthermore, such equipment uses a range of communication protocols/standards and connections, such as CANBus ISO 11783, SAE J1939, RS232, RF, CDMA/GSM, which need to be accommodated.

It would be desirable to provide a system, method and/or apparatus for addressing or at least ameliorating the aforementioned condition of cab clutter while accommodating some of the electronic equipment that is often required in vehicles and in particular in off-road vehicles typically employed in agricultural, construction, mining, forestry and similar environments.

SUMMARY OF THE PREFERRED EMBODIMENT

In one form, although it need not be the broadest form, the invention resides in a control unit configured to be fittingly received in a pre-existing cavity in an off-road vehicle, said control unit comprising a dual-frequency positioning receiver to determine a position of the off-road vehicle.

In another form, although again not necessarily the broadest form, the invention resides in a control unit configured to be fittingly received in a pre-existing cavity in an off-road vehicle, said control unit comprising an attitude and heading reference system (AHRS).

In another form, although again not necessarily the broadest form, the invention resides in a control unit configured to be fittingly received in a pre-existing cavity in an off-road vehicle, said control unit comprising a processor; at least one positioning receiver operatively coupled to the processor; and at least two sensors operatively coupled to the processor; wherein the processor receives inputs from the at least one positioning receiver and the at least two sensors to determine an attitude and heading of the off-road vehicle in response to said inputs. The at least two sensors include a combination of the following: an accelerometer, gyroscopes, a magnetometer, ground speed radar, optical sensors.

In a further form, although again not necessarily the broadest form, the invention resides in a control unit configured to be fittingly received in a pre-existing cavity in an off-road vehicle, said control unit comprising: a processor coupled to be in communication with a steering mechanism of the vehicle; and at least one positioning receiver operatively coupled to the processor; wherein the processor receives inputs from the at least one positioning receiver for steering the vehicle via the steering mechanism in response to said inputs.

In a yet further form, although again not necessarily the broadest form, the invention resides in a control unit configured to be fittingly received in a pre-existing cavity in an off-road vehicle, said control unit comprising: a processor coupled to be in communication with a control mechanism of an implement coupled to the vehicle; and at least one positioning receiver operatively coupled to the processor; wherein the processor receives inputs from the at least one positioning receiver for controlling the implement via the control mechanism in response to said inputs. Suitably, the at least one positioning receiver is a single-frequency or dual-frequency positioning receiver. Suitably, the at least one positioning receiver and the dual-frequency positioning receiver can receive signals from satellites belonging to the Global Positioning System (GPS), the Global Navigation Satellite System (GLONASS), and/or the Galileo satellite system. Suitably, the pre-existing cavity in the off-road vehicle is a cavity in an instrument panel or dashboard of the vehicle. Preferably, the pre-existing cavity in the off-road vehicle is a DIN slot. The DIN slot may be a single DIN slot or a double DIN slot. Suitably, the control unit comprises one or more of the following operatively coupled to the processor: a user interface; an AM/FM radio receiver; a US weatherband radio receiver; a satellite radio; a removable data storage interface; an optical disc player; GSM/CDMA radio receivers for remote service and diagnostics; communication standard interfaces, such as ISO 11783 CAN, SAEJ1939 CAN, CAN 3, CAN 4, COM 1, COM 2.

Further features of the present invention will become apparent from the following detailed description.

BRIEF DESCRIPTION OF THE DRAWINGS

By way of example only, preferred embodiments of the invention will be described more fully hereinafter with reference to the accompanying drawings, wherein.

DETAILED DESCRIPTION OF THE INVENTION

Figure 1:
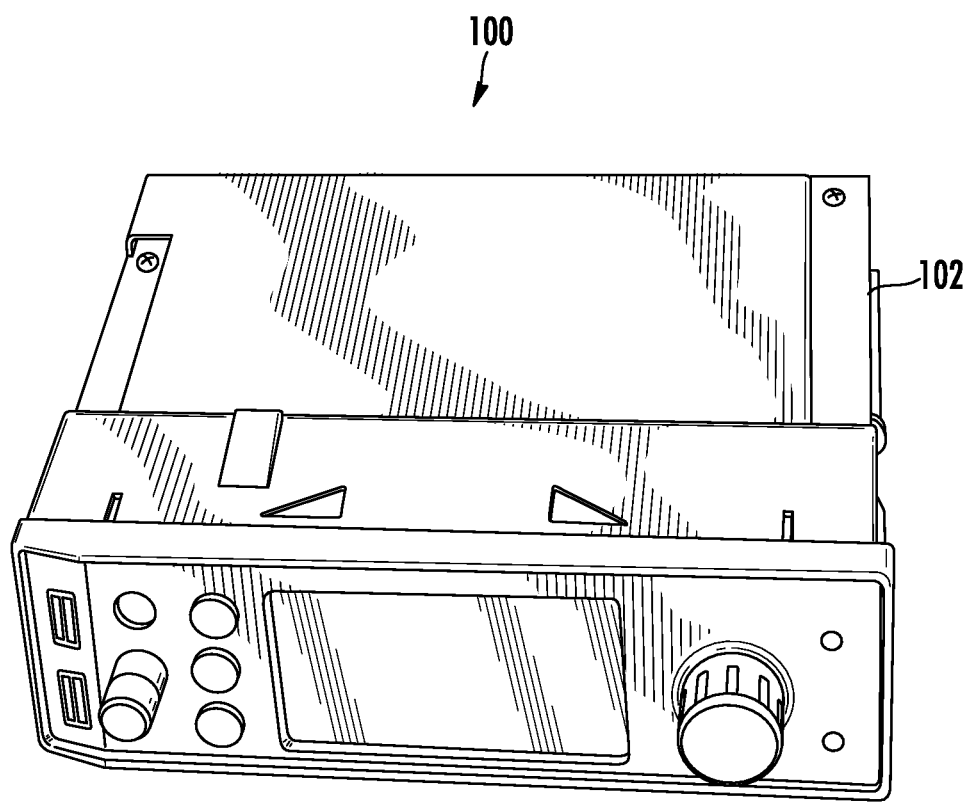
FIG. 1 is a front perspective view of a control unit in accordance with embodiments of the present invention.

Referring to FIG. 1, there is provided a control unit 100 for off-road vehicles that are typically employed in agricultural, construction, mining, forestry and similar environments. The control unit 100 is configured to be fittingly received in a pre-existing cavity in an off-road vehicle and in one embodiment of the present invention, the control unit 100 is configured to be fittingly received in a cavity in an instrument panel or dashboard of the vehicle. In a preferred embodiment of the present invention, the control unit 100 is configured to be fittingly received in a DIN slot of the vehicle. A DIN slot has standard dimensions conforming to ISO standards and can be in the form of a single DIN slot or a double DIN slot comprising a pair of adjacent DIN slots. The control unit 100 comprises a housing 102 having dimensions such that the housing can be fittingly received in the DIN slot. Accordingly, in one embodiment, the dimensions of the housing are 182 mm×53 mm×160 mm.

Figure 2:
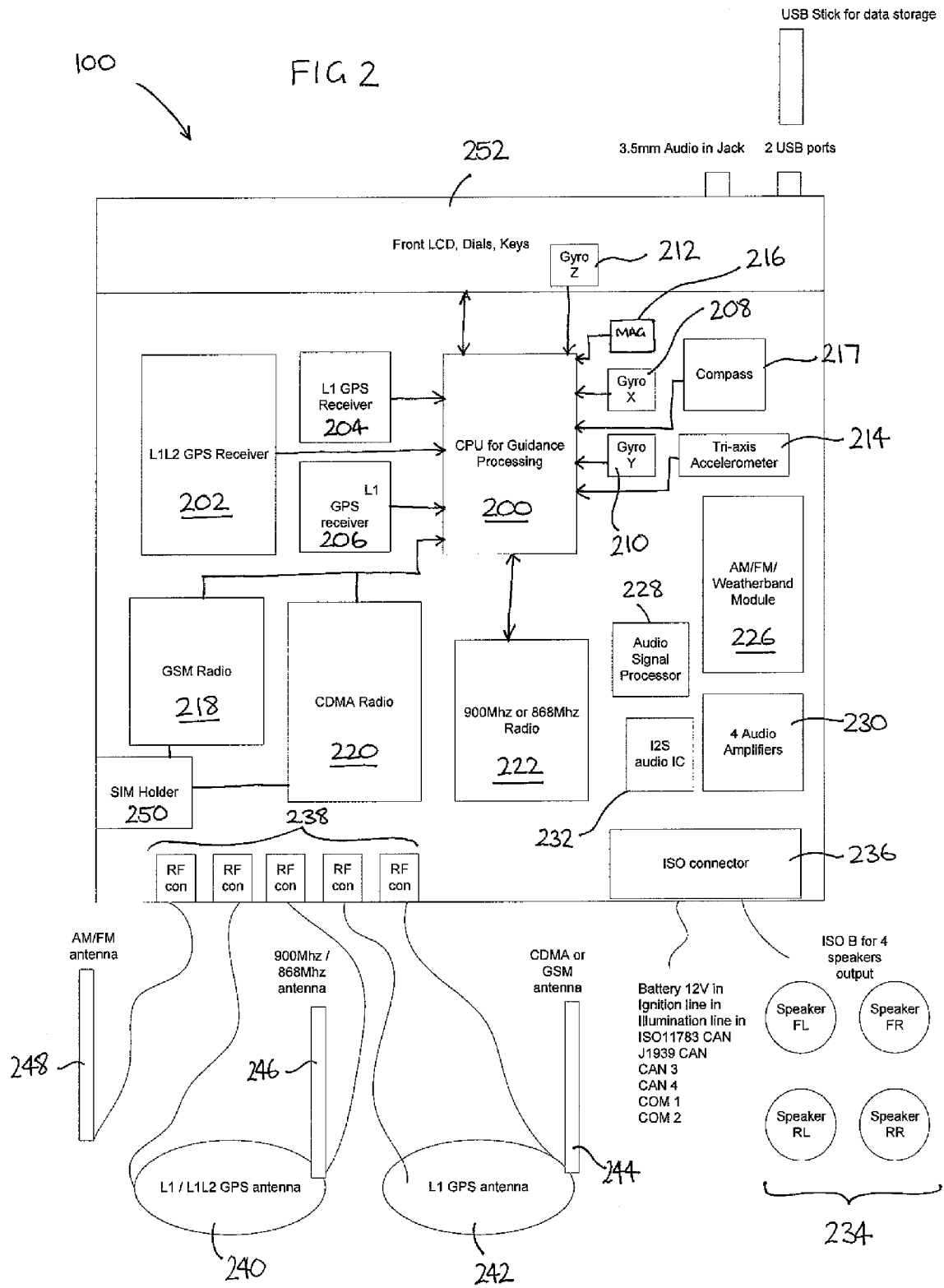
FIG. 2 is a schematic representation of the control unit shown in FIG. 1.

Components of the control unit 100 are shown in FIG. 2, although not all connections between the components are shown to preserve the clarity of the drawing. Nonetheless, such connectivity will be apparent to one of ordinary skill in the relevant art.

With reference to FIG. 2, the control unit 100 comprises a housing 102 that houses a processor 200 and, preferably, a dual-frequency positioning receiver 202 operatively coupled to the processor 200. The control unit 100 also comprises at least one and optionally two single-frequency positioning receivers 204, 206 operatively coupled to the processor 200. (Specifically, the control unit 100 preferably includes two single-frequency positioning receivers 204, 206 or one single-frequency positioning receiver and one dual-frequency positioning receiver 202. Less preferably, the control unit 100 includes one dual-frequency positioning receiver 202 and one single-frequency positioning receiver 204.) The dual-frequency positioning receiver 202 and the single-frequency positioning receivers 204, 206 can receive signals from satellites belonging to the Global Positioning System (GPS), the Global Navigation Satellite System (GLONASS), and/or the Galileo satellite system.

The control unit 100 also comprises at least two sensors operatively coupled to the processor 200. The sensors are housed within the housing 102 and include gyroscopes 208, 210, 212 for measuring angular velocity in each of the orthogonal X, Y, Z axes, a tri-axis accelerometer 214 for measuring acceleration in each of the orthogonal X, Y, Z axes, and either a magnetometer 216 for detecting and providing a position with reference to the earth's magnetic field or a compass 217. Other sensors that can be included in the housing 102 of the control unit 100 or operatively coupled to the control unit, but which are not shown in FIG. 2, include optical sensors and ground speed radar. The aforementioned sensors are operatively coupled to the processor 200.

The control unit 100 also comprises one of two types of communication means: a GSM radio receiver 218 and a CDMA radio receiver 220, one of which is operatively coupled to the processor 200 and is disposed housed within the housing 102. (It is generally not necessary to have both in one control unit, since GSM is the standard in many places outside of the United States and CDMA is the standard within the United States.) A radio transceiver 222 is operatively coupled to the processor 200 and provides a communication pathway for remote sensor data and also is preferably housed within the housing. Depending on the region in which the control unit 100 will be operating, the radio transceiver 222 operates at 900 MHz or 868 MHz.

The control unit 100 preferably comprises an AM/FM/weatherband radio module 226 operatively coupled to an audio signal processor 228 and audio amplifiers 230. An I2S audio integrated circuit 232 is operatively coupled to audio signal processor 228, which is operatively coupled to processor 200. Each of these module, amplifiers, circuit and processor is preferably housed within the housing 102. Audio amplifiers 230, also preferably housed within the housing 102, are operatively coupled to loud speakers 234 via ISO connector interface 236, which is preferably within the housing 102. Loud speakers 234 can include speakers for the front left, front right, rear left and rear right of the vehicle cab.

Although not shown in FIG. 2, the control unit 100 can also comprise, or be operatively coupled to, one or more of the following: a satellite radio receiver, a decoder for audio formats such as MP3, WMA etc., an optical disc player for CDs and/or DVDs, a temperature sensor, a real time clock, watchdog logic to allow reset from a software lock-up.

The control unit 100 also comprises radio frequency connectors 238 for operatively coupling positioning receivers 202, 204, 206, GSM and CDMA radio receivers 218, 220, radio transceiver 222 and radio module 226 to their respective antennae 240, 242, 244, 246 and 248. The radio frequency connectors 238 are preferably substantially or totally disposed within the housing 102.

The control unit 100 also comprises a subscriber identity module (SIM) holder 250 for receiving a SIM card to provide the control unit with a unique identity for communication purposes. The SIM card is preferably disposed within the housing 102. The control unit 100 also comprises a user interface 252 comprising input and output devices, which are described in more detail with reference to FIG. 4.

Figure 3:
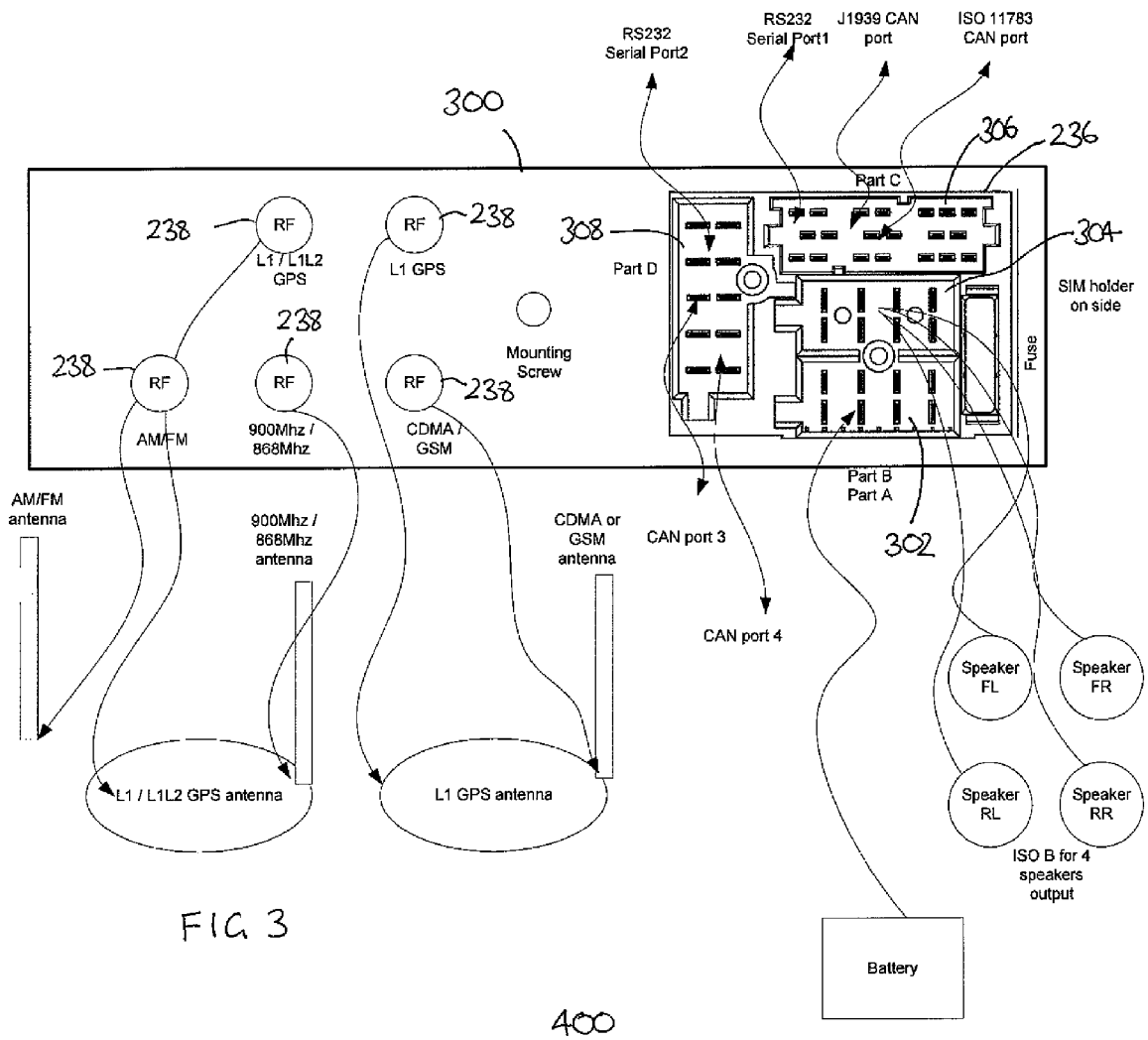
FIG. 3 is a schematic representation of a rear panel of the control unit of FIG. 1 in accordance with embodiments of the present invention.

With reference to FIG. 3, which shows a rear panel 300 of the control unit 100, ISO connector interface 236 comprises four parts. A first part 302 (Part A) allows for connection to the electrical supply of the off-road vehicle, such as a 12V battery and to ignition and illumination lines of the off-road vehicle. A second part 304 (Part B) allows for the connection of loud speakers 234. A third part 306 (Part C) allows for communications via standard communication protocols and comprises an ISO 11783 CAN port, an SAE J1939 CAN port and an RS232 serial port. A fourth part 308 (Part D) also allows for communications via standard communication protocols and comprises an additional RS232 serial port and additional CAN ports, CAN 3 and CAN 4. Other embodiments of the ISO connector interface 236 comprise one or more COM ports. FIG. 3 also shows one possible configuration of the radio frequency connectors 238 in the rear panel 300.

Figure 4:
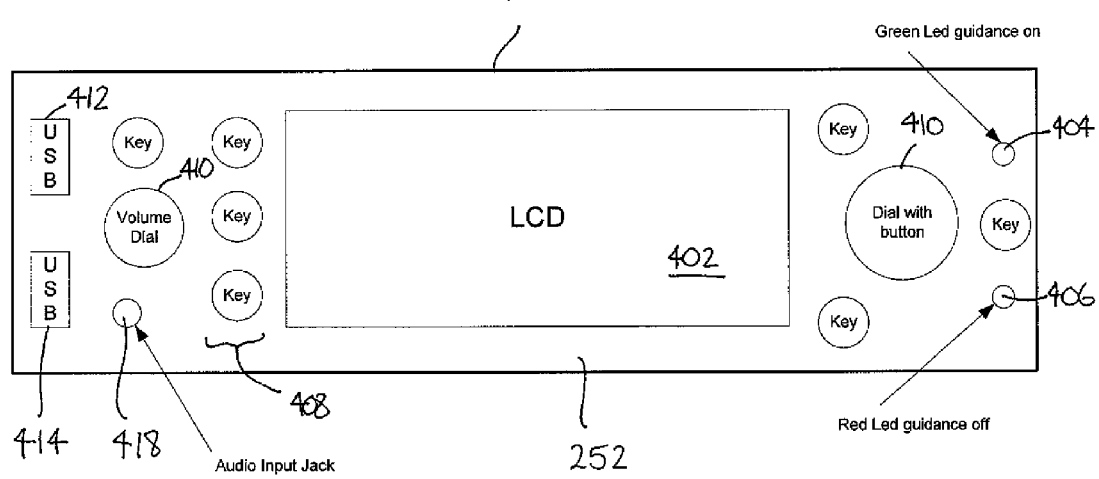
FIG. 4 is a schematic representation of a front panel of the control unit of FIG. 1 in accordance with embodiments of the present invention.

Referring to FIG. 4, a front panel 400 of the control unit 100 comprises the user interface 252, which comprises output devices including an LCD screen 402 and LEDs 404, 406 and input devices including keys 408 and dials 410. User interface 252 is also provided with one or more USB ports 412, 414 for connecting, for example, removable data storage or other external device, such as an MP3 player. User interface 252 also comprises a standard audio input jack 418 for connecting, for example, headphones or other external devices to the control unit 100.

According to one embodiment of the present invention, the dual-frequency positioning receiver 202 of the control unit 100 fittingly received in a pre-existing cavity of an off-road vehicle receives signals at two different frequencies from satellites in a positioning system to accurately determine a position of the off-road vehicle. For example, where the positioning system is the GPS, the dual-frequency positioning receiver 202 receives signals L1 at 1575.42 MHz and L2 at 1227.6 MHz to determine the position of the off-road vehicle to within tens of centimeters or so.

According to other embodiments of the present invention, the processor 200 receives inputs from at least one of the positioning receivers 202, 204, 206 and from at least two of the sensors 208, 210, 212, 214, 216, 217 to determine an attitude and heading of the off-road vehicle in response to the inputs.

In one embodiment, the control unit 100 comprises an attitude and heading reference system (AHRS) in which the processor 200 utilizes inputs from at least one of the positioning receivers 202, 204, 206, one or more of the aforementioned sensors 208, 210, 212, 214, 216, 217 and optionally the inputs from one or more other sensors, such as optical sensors and ground speed radar, to determine an attitude and heading of the off-road vehicle irrespective of whether the off-road vehicle is static or in motion.

In another embodiment, the processor 200 of the control unit 100 utilizes inputs from at least one of the positioning receivers 202, 204, 206, the gyroscopes 208, 210, 212 and the tri-axis accelerometer 214 in a positioning/inertial navigation system (INS) to determine an attitude and heading of the off-road vehicle when the off-road vehicle is in motion.

According to another embodiment of the present invention, the processor 200 of the control unit 100 is coupled to be in communication with a steering mechanism of the off-road vehicle via ISO connector interface 236 and one of the CAN ports. In response to inputs received from at least one of the positioning receivers 202, 204, 206, the processor applies a control algorithm to control the steering of the off-road vehicle via the steering mechanism.

According to a further embodiment of the present invention, the processor 200 of the control unit 100 is coupled to be in communication with a control mechanism of an implement or attachment coupled to the off-road vehicle via ISO connector interface 236 and, for example, one of the CAN ports. The implement or attachment can be any implement or attachment that is mounted to, or can be applied to, an off-road vehicle. In response to inputs received from at least one of the positioning receivers 202, 204, 206, the processor 200 applies a control algorithm to control the implement via the control mechanism. For example, in the close cultivation of crops, the implement can be a variable rate spray boom operatively coupled to a tractor. The control unit 100 can thus accurately guide the boom to spray only in crop growing areas to minimize the amount of herbicide used. The implement or attachment control aspect can be combined with the aforementioned steering control aspect of the present invention for a range of agricultural and other applications.

According to some embodiments of the present invention, the processor 200 of the control unit 100 is coupled to be in communication with a virtual terminal (VT) of the off-road vehicle via the network bus (CANBus ISO 11783) of the vehicle.

Whilst the embodiments of the present invention have been described with the majority of components being contained within or mounted on the housing 102 of the control unit 100, it is envisaged that some components could be located outside the housing 102 and mounted within or on the cab of the off-road vehicle. For example, one or more of the positioning receivers 202, 204, 206 and/or one or more of the radio receivers could be mounted on the cab of the vehicle along with the associated antennae. In this arrangement, the cab is not cluttered with the receivers and the control unit 100 still consolidates a range of equipment required in the off-road vehicle.

Hence, the control unit 100 of the present invention thus provides a solution to the aforementioned prior art problem of cab clutter by providing a control unit that is configured to be fittingly received in a pre-existing cavity in an off-road vehicle and preferably in a DIN slot of the off-road vehicle. The control unit 100 preferably replaces the entertainment unit typically found in the DIN slot of the vehicle and consolidates and centralizes the software applications typically required in off-road vehicles used in agricultural, construction, mining and forestry applications. The control unit 100 preferably has the functionality to perform a wide range of activities including, but not limited to precision agriculture, flow control, remote service and diagnostics, land management, record keeping, automated steering control, attachment or implement management, asset or fleet training, user training, software upgrades, file server and task controller services to devices on the local machine network bus in addition to the functions of both an inertial navigation system (INS) and an attitude and heading reference system (AHRS). Nonetheless, the control unit 100 also includes entertainment capabilities including, AM/FM radio, satellite radio, CD/DVD/MP3/WMA playback and connectivity for such players so that the operator of the off-road vehicle does not have to forego entertainment previously provided by the entertainment unit typically found in the DIN slot.

Throughout the specification the aim has been to describe the present invention without limiting the invention to any one embodiment or specific collection of features. Persons skilled in the relevant art may realize variations from the specific embodiments that will nonetheless fall within the scope of the present invention.

The invention claimed is:

1. A control unit comprising:
   means for entertaining;
   means for communicating;
   means for navigating;
   means for controlling steering of an off-road vehicle via a steering mechanism of the off-road vehicle; and
   a housing that houses the means for entertaining, means for communicating, means for navigating, and means for controlling steering of the off-road vehicle, the housing sized to be fittingly received in a pre-existing cavity of a dashboard in the off-road vehicle, the housing having a width of 182 mm and a height of 53 mm.

2. The control unit according to claim 1, wherein the housing has a depth of 160 mm.

3. A control unit disposed in a cab of an off-road vehicle used in an agricultural, construction, mining or forestry application, comprising:
   a user interface;
   an attitude and heading reference system including a processor and at least one of a positioning receiver, magnetometer, compass, gyro and accelerometer electrically connected to the processor, wherein the processor is in communication with a steering mechanism of the off-road vehicle; and a housing sized to be fittingly received in a pre-existing slot in an instrument panel or dashboard of the cab of the off-road vehicle, the housing having a width of 182 mm and height of 53 mm.

4. The control unit according to claim 3, further comprising at least one of (i) a radio receiver capable of receiving at least one of AM, FM and weatherband frequencies, (ii) a CD player, (iii) amplifiers, (v) a satellite radio, (vi) an MP3 player, (vii) a WMA player, and (viii) a DVD player.

5. The control unit according to claim 3, further comprising a radio receiver and a radio transceiver.

6. The control unit according to claim 3, further comprising an RF connector, a serial port and a CAN port for connecting with at least one control system of the off-road vehicle including a steering mechanism, a control mechanism for an implement and a virtual terminal.

7. The control unit according to claim 3, wherein the positioning receiver is a single-frequency or dual-frequency positioning receiver.

8. The control unit according to claim 3, wherein the user interface includes a removable data storage interface.

9. The control unit according to claim 3, wherein the user interface comprises an LED, an LCD and a dial for inputting information by a user and displaying information to a user.

10. The control unit according to claim 3, further comprising a subscriber identity module holder for receiving a card to provide the control unit with a unique identity for communication.

11. A control unit disposed in a cab of an off-road vehicle used in an agricultural, construction, mining or forestry application, comprising:
    a user interface;
    an attitude and heading reference system including a processor and at least one of a positioning receiver, magnetometer, compass, gyro and accelerometer electrically connected to the processor, wherein the processor is in communication with a steering mechanism of the off-road vehicle; and
    a housing sized to be fittingly received in a pre-existing slot in an instrument panel or dashboard of the cab of the off-road vehicle, the housing having a width of 182 mm and height of 106 mm.

12. A control unit disposed in the cab of an off-road vehicle, comprising:
    a user interface;
    an attitude and heading reference system including:
        a processor;
        a plurality of gyroscopes for measuring angular velocity in orthogonal X, Y, Z axes; and
        either a magnetometer for detecting and providing a position with reference to the earth's magnetic field or a compass;
    an entertainment system including:
        a radio receiver; and
        a CD or DVD player; and
    a housing sized to be fittingly received in a pre-existing slot in an instrument panel or dashboard of the vehicle the cab of the off-road vehicle, the housing having a width of 182 mm and height of 53 mm, wherein:
        the processor is in communication with a steering mechanism of the off-road vehicle; and
        the processor is in communication with a control mechanism of an implement or attachment coupled to the off-road vehicle via a connector interface.

13. The control unit according to claim 12, wherein the off-road vehicle includes a tractor and the implement or attachment includes a variable rate spray boom coupled to the tractor, wherein the processor executes a control algorithm to control the variable rate spray boom in response to inputs received from positioning receivers disposed within the housing.

14. The control unit according to claim 12, wherein the processor executes an algorithm to guide the boom to spray only in crop growing areas to minimize an amount of herbicide used.

15. The control unit according to claim 12, wherein the attitude and heading reference system further includes:
    optical sensors and ground speed radar to determine an attitude and heading of the off-road vehicle irrespective of whether the off-road vehicle is static or in motion.

16. The control unit according to claim 12, wherein the off-road vehicle includes a virtual terminal and the control unit is coupled to be in communication with the virtual terminal of the off-road vehicle via a network bus of the off-road vehicle.

17. The control unit according to claim 12, wherein housing has a depth of 160 mm.

18. The control unit according to claim 12, the radio receiver configured to receive weatherband frequencies.

19. The control unit according to claim 18, the control unit further comprising a real time clock and a temperature sensor.

20. A control unit disposed in the cab of an off-road vehicle, comprising:
    a user interface;
    an attitude and heading reference system including:
        a processor;
        a plurality of gyroscopes for measuring angular velocity in orthogonal X, Y, Z axes; and
        either a magnetometer for detecting and providing a position with reference to the earth's magnetic field or a compass;
    an entertainment system including:
        a radio receiver; and
        a CD or DVD player; and
    a housing sized to be fittingly received in a pre-existing slot in an instrument panel or dashboard of the vehicle the cab of the off-road vehicle, the housing having a width of 182 mm and height of 106 mm, wherein:
        the processor is in communication with a steering mechanism of the off-road vehicle; and
        the processor is in communication with a control mechanism of an implement or attachment coupled to the off-road vehicle via a connector interface.

* * * * *